(12) United States Patent
Yamamoto et al.

(10) Patent No.: US 11,509,149 B2
(45) Date of Patent: Nov. 22, 2022

(54) MODULAR DEVICE CHARGING STATION

(71) Applicant: Scosche Industries, Inc., Oxnard, CA (US)

(72) Inventors: Yasuhiro Yamamoto, Thousand Oaks, CA (US); Mark Larson, Camarillo, CA (US); Vince Alves, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 20 days.

(21) Appl. No.: 16/234,305

(22) Filed: Dec. 27, 2018

(65) Prior Publication Data
US 2020/0212689 A1  Jul. 2, 2020

(51) Int. Cl.
| | |
|---|---|
| *H02J 7/00* | (2006.01) |
| *H02J 7/02* | (2016.01) |
| *H02J 50/00* | (2016.01) |
| *H02J 50/10* | (2016.01) |
| *H02J 50/40* | (2016.01) |

(52) U.S. Cl.
CPC .......... *H02J 7/0027* (2013.01); *H02J 7/0045* (2013.01); *H02J 7/025* (2013.01); *H02J 50/00* (2016.02); *H02J 50/10* (2016.02); *H02J 50/40* (2016.02)

(58) Field of Classification Search
CPC ............. H02J 7/045; H02J 7/044; H02J 7/042
USPC .................................. 320/115, 114
See application file for complete search history.

(56) References Cited

U.S. PATENT DOCUMENTS

| | | | |
|---|---|---|---|
| 3,329,277 A | | 7/1967 | Gaudino |
| 3,642,122 A | | 2/1972 | Von Ende |
| 4,047,787 A | * | 9/1977 | Gumb .................... H01R 31/00 439/344 |

(Continued)

FOREIGN PATENT DOCUMENTS

| | | |
|---|---|---|
| CN | 201113495 | 9/2008 |
| CN | 202042680 | 11/2011 |

(Continued)

OTHER PUBLICATIONS

International Search Report & Written Opinion for Application No. PCT/US2019/068589; dated Mar. 19, 2020.

(Continued)

*Primary Examiner* — David V Henze-Gongola
*Assistant Examiner* — Tarikh Kanem Rankine
(74) *Attorney, Agent, or Firm* — Stetina Brunda Garred & Brucker

(57) ABSTRACT

A modular device charging station connectible to a power source through a cable includes an input endcap defining a power connector slot and a plurality of input locator pins in a predefined layout. A cradle body is defined by a device receptacle, with an input side having a power connector socket connectible to the cable and defining one or more input side locator holes receptively engageable with the input locator pins. An output side A pass-through power connector plug and a plurality of output locator pins in the predefined layout are on an output side. A terminating endcap defines a plug pocket and a plurality of terminating-side locator holes in the predefined layout receptively engageable with the output locator pins. A charging circuit with a power signal input is connected to the power connector socket, and the pass-through power connector plug is electrically connected to the power connector socket.

10 Claims, 8 Drawing Sheets

(56) References Cited

U.S. PATENT DOCUMENTS

| | | | |
|---|---|---|---|
| 4,070,078 A * | 1/1978 | Chrones | H01R 13/447 174/67 |
| D306,396 S | 3/1990 | Brushaber | |
| D317,697 S | 6/1991 | Lage | |
| D327,840 S | 7/1992 | Askew | |
| 5,213,240 A | 5/1993 | Dietz et al. | |
| 5,272,281 A * | 12/1993 | Bouley | H01R 13/6395 174/67 |
| 5,303,749 A * | 4/1994 | Stock | B09B 3/0058 141/329 |
| 5,369,565 A * | 11/1994 | Chen | H02J 7/0042 224/902 |
| D362,230 S | 9/1995 | Yokozawa | |
| D362,657 S | 9/1995 | Tomikawa et al. | |
| 5,556,289 A * | 9/1996 | Holbrook, Jr. | H01R 13/447 174/67 |
| D398,796 S | 9/1998 | Fauchald | |
| 5,989,052 A * | 11/1999 | Fields | H01R 13/447 439/144 |
| 5,992,807 A | 11/1999 | Tarulli | |
| 6,075,499 A | 6/2000 | Edwards et al. | |
| 6,076,790 A | 6/2000 | Richter | |
| 6,135,408 A | 10/2000 | Richter | |
| 6,149,116 A | 11/2000 | Won | |
| 6,305,656 B1 | 10/2001 | Wemyss | |
| 6,382,482 B1 | 5/2002 | Chao | |
| 6,502,727 B1 | 1/2003 | Decoteau | |
| 6,594,051 B1 | 7/2003 | Chaplin et al. | |
| D479,196 S | 9/2003 | Shih | |
| D489,578 S | 5/2004 | Lai | |
| 6,888,940 B1 | 5/2005 | Deppen | |
| 7,021,593 B1 | 4/2006 | Fan | |
| D521,850 S | 5/2006 | Richter et al. | |
| D530,333 S | 10/2006 | Richter | |
| D543,439 S | 5/2007 | Brassard | |
| D551,058 S | 9/2007 | Carnevali | |
| D552,454 S | 10/2007 | Fynn | |
| D553,959 S | 10/2007 | Brassard | |
| D554,042 S | 10/2007 | Richter | |
| D554,491 S | 11/2007 | Stenberg | |
| 7,296,771 B2 | 11/2007 | Kalis et al. | |
| D560,592 S | 1/2008 | Brassard | |
| D563,309 S | 3/2008 | Richter | |
| D565,937 S | 4/2008 | Tsai | |
| 7,374,142 B2 | 5/2008 | Carnevali | |
| D570,836 S | 6/2008 | Chen | |
| D576,865 S | 9/2008 | Chiang et al. | |
| 7,431,251 B2 | 10/2008 | Carnevali | |
| D588,903 S | 3/2009 | Carnevali | |
| D590,835 S | 4/2009 | Richter | |
| D592,205 S | 5/2009 | O'Brien | |
| D600,991 S | 9/2009 | Lai | |
| D603,322 S | 11/2009 | Nicieja | |
| D609,644 S | 2/2010 | Lin | |
| D638,008 S | 5/2011 | Richter | |
| 8,016,255 B2 | 9/2011 | Lin | |
| D654,874 S | 2/2012 | Au | |
| D656,465 S | 3/2012 | Au | |
| D656,899 S | 4/2012 | Webb et al. | |
| D670,157 S | 11/2012 | Mo | |
| D671,074 S | 11/2012 | Hori et al. | |
| D677,709 S | 3/2013 | Skeoch et al. | |
| D681,867 S | 5/2013 | Wegger et al. | |
| D686,595 S | 7/2013 | Andre et al. | |
| 8,496,222 B2 | 7/2013 | Li | |
| D687,441 S | 8/2013 | Janzen | |
| D694,249 S | 11/2013 | Akana et al. | |
| D700,175 S | 2/2014 | Ohm | |
| D705,211 S | 5/2014 | Huang | |
| D709,066 S | 7/2014 | Byun | |
| D709,072 S | 7/2014 | Askew-Harris et al. | |
| D713,398 S | 9/2014 | Alesi et al. | |
| D715,132 S | 10/2014 | McSweyn et al. | |
| D718,612 S | 12/2014 | McSweyn et al. | |
| D719,959 S | 12/2014 | Vogel | |
| 10,778,020 B1 * | 9/2020 | Torem | H02J 7/0042 |
| 2005/0092875 A1 | 5/2005 | Carnevali | |
| 2006/0208697 A1 * | 9/2006 | Chan | H02J 7/0042 320/116 |
| 2006/0290654 A1 | 12/2006 | Wang | |
| 2007/0002533 A1 * | 1/2007 | Kogan | H02J 7/0042 361/679.41 |
| 2007/0018064 A1 | 1/2007 | Wang | |
| 2008/0023606 A1 | 1/2008 | Kalis et al. | |
| 2010/0033127 A1 | 2/2010 | Griffin, Jr. et al. | |
| 2010/0238655 A1 * | 9/2010 | Sloan | F21S 4/28 362/225 |
| 2011/0192857 A1 | 8/2011 | Rothbaum et al. | |
| 2011/0241608 A1 * | 10/2011 | Adamczyk | H02J 7/0013 320/108 |
| 2012/0229300 A1 | 9/2012 | Fu | |
| 2012/0292463 A1 | 11/2012 | Burns | |
| 2012/0295451 A1 | 11/2012 | Kim et al. | |
| 2013/0043827 A1 | 2/2013 | Weinstein et al. | |
| 2013/0154566 A1 * | 6/2013 | Emslie | H02J 7/0044 320/115 |
| 2013/0157483 A1 * | 6/2013 | Yu | H01R 31/065 439/131 |
| 2013/0187020 A1 | 7/2013 | Trotsky | |
| 2014/0106609 A1 * | 4/2014 | Strauser | G06F 1/1632 439/533 |
| 2014/0346295 A1 | 11/2014 | Song | |
| 2014/0357094 A1 | 12/2014 | Kim | |
| 2014/0368163 A1 | 12/2014 | Ho | |
| 2015/0104967 A1 * | 4/2015 | Jaan | H01R 13/6275 439/352 |
| 2015/0207351 A1 | 7/2015 | Hamburgen et al. | |
| 2015/0288205 A1 | 10/2015 | Weinstein | |
| 2017/0033579 A1 * | 2/2017 | Maguire | H02J 7/0044 |
| 2017/0214260 A1 | 7/2017 | Kim | |
| 2017/0271900 A1 * | 9/2017 | Rose | H01R 25/006 |
| 2017/0279295 A1 * | 9/2017 | Wojcik | H01M 10/46 |
| 2017/0346317 A1 * | 11/2017 | Hodges | A63F 13/24 |
| 2018/0123361 A1 * | 5/2018 | Gray | H02J 7/0022 |
| 2019/0341791 A1 * | 11/2019 | Grifoni | H02J 7/0045 |

FOREIGN PATENT DOCUMENTS

| | | | |
|---|---|---|---|
| CN | 203416030 | | 1/2014 |
| CN | 203193688 | | 11/2015 |
| CN | 206195404 U | | 5/2017 |
| CN | 108306391 A | | 7/2018 |
| JP | 2000231910 | | 11/2015 |
| KR | 101718729 B1 | | 3/2017 |
| KR | 101790891 B1 | | 10/2017 |
| WO | 2017069326 A1 | | 4/2017 |
| WO | WO-2018093022 A1 * | 5/2018 | H02J 7/02 |

OTHER PUBLICATIONS

European Search Report and Opinion for Application No. EP19214118 (dated Mar. 19, 2020).

The Original iMagnet Cradle-Less Universal Car Phone Windsheild Dashboard Mount Holder for Iphone 6, 6 Plus, 6S, 6S Plus, 5S 5, Galaxy S6 S5, Note 5 4 3, With Offical iMagnet Logo, iMagnet, Amazon.com, Aug. 19, 2012.

Mounts posted by Scoshe found on Sep. 27, 2016 at http://www.scosche.com/consumer-tech/mounts.

Magnetic Nanoport links phones to accessories, cars, each other; Jan. 7, 2014 http://www.cnet.com/news/magnetic-nanoport-links-phones-to-accessories-cars-each-other/.

Clever smartphone case offers an ingenious way to charge your phone on the go; Jun. 20, 2014 http://bgr.com/2014/06/20/best-smartphone-accessories-zolo/.

Logitech Case+ Review: Brilliant iPhone Case Concept, Flawed Execution; May 13, 2014 http://time.com/98112/logitech-case-plus-review/.

* cited by examiner

MODULAR DEVICE CHARGING STATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to electronic devices and charging devices therefor, and more particularly, to a modular device charging station.

2. Related Art

A wide variety of portable electronic devices are currently in existence on the market, though there has been a recent convergence towards a fewer category of devices that fulfill many needs. Typically, these are smartphones and slightly larger form factor tablets that incorporate general-purpose data processors for which software applications (also known apps) are written. Ample memory and data storage are provided, and so functionalities that may have earlier been provided in separate, independent devices can be integrated into the single smartphone or tablet. Conventional smartphones and tablets may incorporate features of music players, gaming consoles, personal digital assistants, digital still and video cameras, electronic readers, mapping and navigation devices, cellular phones, and so forth. Moreover, several short-to-medium range communications modalities are integrated into these devices, including WiFi and Bluetooth for short-range/local data transfer links, as well as cellular communications systems implementing such standards as GSM (Global System for Mobile Communications), EDGE (Enhanced Data Rates for GSM Evolution), LTE (Long Term Evolution) and the like that can extend the communicative range to practically the entire world by providing access to the global Internet network.

In addition to smartphones and tablets, another category of devices used frequently, if not daily, are smartwatches and health monitors that provide various auxiliary functionality in cooperation with smartphones. Typical implementations include a digital display, a data processor, and a communications interface to establish a continuous link to the smartphone. The data processor may execute a more limited software application that presents information retrieved from a counterpart app on the host smartphone, and accepts limited data entry inputs. Smartwatches and health monitors also incorporate various sensors such as thermometers, accelerometers, pedometers (either as independent hardware components or implemented by software), heart rate monitors, electrocardiograms, and so forth that capture the physical parameters of the user for further processing by the smartphone and beyond.

As with any electronic device, continuing functioning depends on the availability of a power source. In almost all cases, portable electronic devices include an on-board battery or at least the capacity to hold and draw power from the same. When interior space in the device is not as restricted, and the device does not draw much electrical power or is not intended for constant use, standard configuration disposable batteries such as AA, AAA, and the like may be used. However, many slim form factor devices require a uniquely configured battery that fits within the limited confines of the housing, and access thereto for replacement upon power depletion may be limited. Accordingly, such devices incorporate on-board charging circuits that are connectible to external adapters.

An electronic device can be connected to a power source in several different ways. One of the simplest modalities is an AC power adapter with a coaxial connector plug that is received within a corresponding socket on the device. Depending on the current carrying capacity, the size and shape of the plug and sockets may be varied. This variety and lack of standardization amongst manufacturers led to the proliferation of numerous proprietary, manufacturer-specific connectors and adapters that were not compatible with other devices with similar power requirements. Accordingly, there has been a drive towards standardizing power connections for portable electronic devices.

Many manufacturers now utilize Universal Serial Bus (USB) connectors to supply power to its devices. The USB standard, as well as its associated connector configurations, have evolved over many years, and different generations of connectors are in current use. A USB interconnection is comprised of a plug that is receptively engaged in a socket, though the shape and sizes of these connectors differ depending on type. One common type most often used to connect computer peripheral devices is the Type A and Type B connector. There is also a Mini A, Mini B, and Mini AB type connector with a reduced size in comparison to the Type A and Type B connectors. Further evolved from the Mini connectors is the Micro connector, of which there are Micro B and Micro AB connectors. Most recently, the Type-C connectors are being incorporated into electronic devices.

The USB connector is primarily a data transfer link and is therefore suitable for devices that connect to general purpose computers to download data therefrom. Additionally, however, the USB standard defines one line for supply 5V DC power to interconnected devices, thereby eliminating the need for separate power adapters and connections. Despite the widespread adoption of USB/Micro-B connector plugs, some manufacturers have developed alternative connector plugs believed to be superior for application in their devices. These include the 30-pin dock connector and the Lighting connector both developed by Apple, Inc. of Cupertino, Calif.

For the most part, connecting a charging cable to the electronic device is a relatively trivial manual step. However, there may be a number of limitations that can become substantial user experience deficiencies over repeated encounters therewith. One is that Micro-USB connectors are directional, that is, the plug must be oriented in the same direction as the socket, otherwise it cannot be inserted. This becomes problematic in darker environments, where a user must not only hunt around for the socket, but also switch orientations of the plug to determine proper fit. The connectors also lacked proper mechanical support and were thus prone to breakage. Some of the aforementioned proprietary connectors were partially an attempt to solve these problems, as some enhancements to Micro-B connectors were hexagonal in shape and bi-directional, as is the Lightning connector and the USB-C connector.

USB charging cables also share the limitations common across all cable or wire-based connections in that unsightly cables must be positioned to be readily accessible, even when not in use. Furthermore, the connector/plug ends tend to get lost in crevices and other locations near installations.

As a response to these deficiencies, inductive charging was developed. On the charger end, there is an induction coil that is connected to power source and generates an electromagnetic field. This electromagnetic energy is captured by a corresponding induction coil on the electronic device, and passed to the charging circuit without requiring an electrical connection. The Qi charging standard governs the operating parameters and configuration of the device-end and charger-end inductive couplings. Many conventional smartphone and tablets incorporate Qi charging features, as do smart watches, though such devices may utilize a proprietary inductive charger that conforms to the structure of the case.

Thus, the smartphone is among the list of items a person typically carries or has on their person every day, as is the smart watch, and possibly the tablet. Charging all of these devices takes place at home at the end of the day, though owners of older devices with reduced battery capacity may find it necessary to charge the devices whenever a power source is available and the person is static with respect to the power source, e.g., at work, in the car, or carrying a secondary battery charging device.

Connecting each of the aforementioned devices to a charger via a cable can be cumbersome, especially if there are multiple ones. Organizing the cable and placement of the devices become unwieldly. Docking stations with power connections are known in the art, but are specific to each device, and so multiple power connections are needed to accommodate each smartphone, tablet, smart watch, etc. Additionally, charging devices with a single DC power supply and multiple charging cables extending therefrom are known the art, though limited in expandability and the challenges associated with cable management and device placement/organization remain. Accordingly, there is a need in the art for an improved modular device charging station.

BRIEF SUMMARY

The present disclosure is directed a modular device charging station as well as a system for charging a plurality of electronic devices. There may be multiple charging stations and other stations that require electric power which are daisy-chained together over a single common alternating current transmission path.

According to one embodiment, the modular device charging station may be connectible to a power source through a cable and include an input endcap defining a power connector slot. The input endcap may include a plurality of input locator pins in a predefined layout. Additionally, the modular device charging station may include a cradle body defined by a device receptacle, an input side, and an opposed output side. The input side of the cradle body may include a power connector socket connectible to the cable. The power connector socket may also be in alignment with the power connector slot of the input endcap. The input side of the cradle may also include one or more input side locator holes receptively engageable with the input locator pins of the input endcap. The output side of the cradle body may include a pass-through power connector plug and a plurality of output locator pins in the predefined layout. The modular device charging station may further include a terminating endcap that defines a plug pocket that is in alignment with the pass-through power connector plug and a plurality of terminating-side locator holes in the predefined layout. The terminating-side locator holes may be receptively engageable with the output locator pins of the cradle body. The modular device charging station may also include a charging circuit with a power signal input connected to the power connector socket. The pass-through power connector plug may be electrically connected to the power connector socket.

Another embodiment of the present disclosure is a system for charging a plurality of electronic devices. The system may include a first device charging station with a first cradle body, a first power connector socket receptive to a power cable, and a first pass-through power connector plug in axial alignment with the first power connector socket. The first device charging station may include a first charging circuit with a power signal input connected to the first power connector socket. The first pass-through power connector plug may be electrically connected to the first power connector socket. The system may also include a second device charging station with a second cradle body. The second device charging station may also include a second power connector socket that is receptive to the first pass-through power connector plug of the first device charging station. A second pass-through power connector plug may be in axial alignment with the second power connector socket. Furthermore, the second device charging station may include a second charging circuit with a power signal input connected to the second power connector socket. The second pass-through power connector plug may be electrically connected to the second power connector socket. The first device charging device station and the second device charging station may be in removable engagement with each other.

In accordance with another embodiment of the present disclosure, there may be a modular device charging station connectible to a power source through a cable. The device charging station may include a cradle body defined by a device receptacle, an input side, and an opposed output side. The input side of the cradle body may include a power connector socket connectible to the cable, and one or more input side locators in a predefined layout receptively engageable with corresponding input locator interfaces. The output side of the cradle body may include a pass-through power connector plug and a plurality of output locators in the predefined layout. The device charging station may further include a charging circuit with a power signal input connected to the power connector socket. The pass-through power connector plug may be electrically connected to the power connector socket.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a mobile device charging station and a system for charging a plurality of electronic devices. This description is not intended to represent the only form in which the disclosed charging station or the system may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, left and right, proximal and distal, and the like are used solely to distinguish one from another entity without necessarily requiring or implying any actual such relationship or order between such entities.

Figure 1:
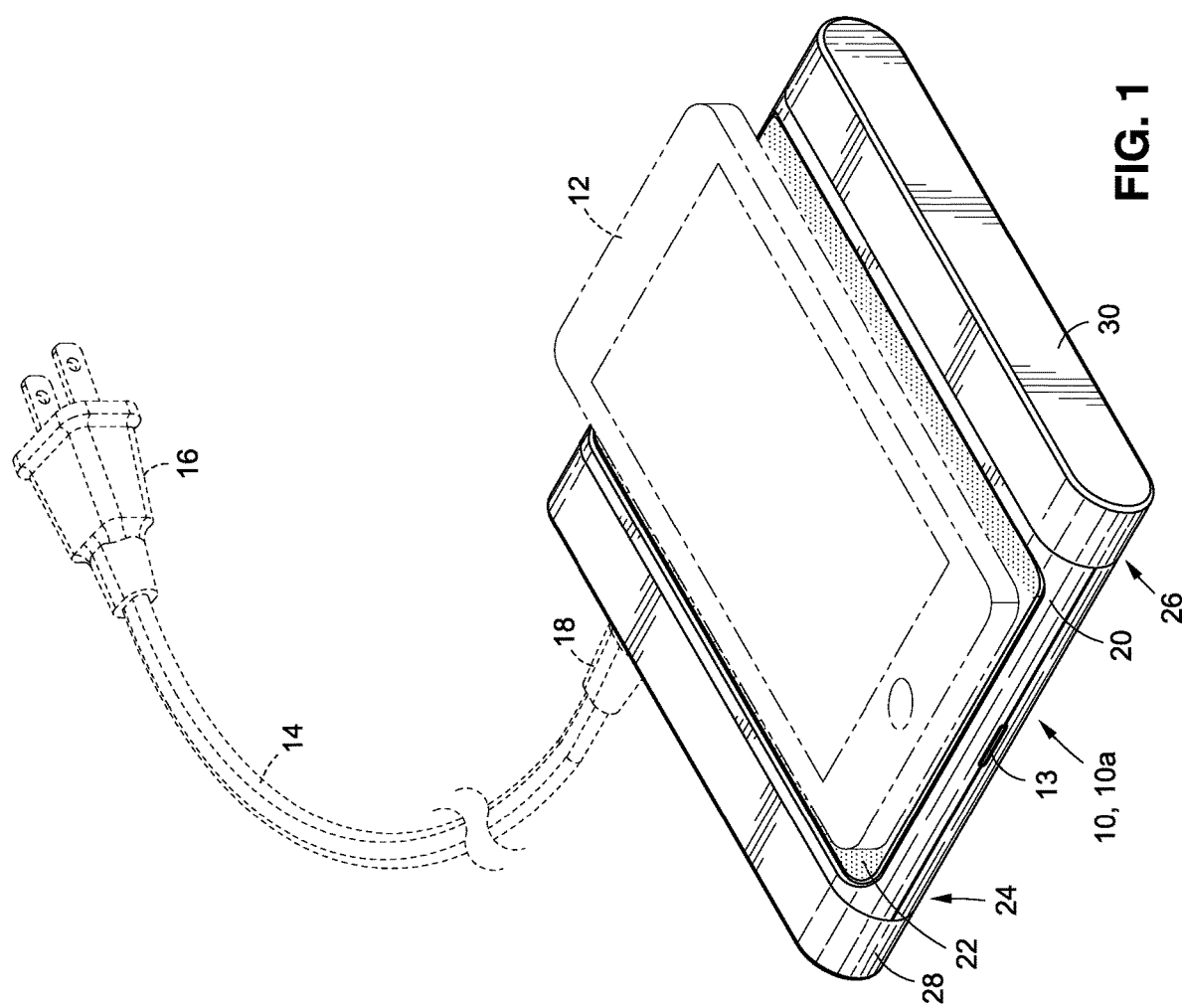
FIG. 1 is a perspective view of a modular device charging station according to one embodiment of the present disclosure.

Referring now to FIG. 1, there is depicted a first embodiment 10a of a modular device charging station in accordance with the present disclosure. The depicted first embodiment is understood to incorporate an inductive charging modality, in which a mobile device 12 or smartphone can merely be placed on to the charging station 10. Specifically, the inductive charging element integrated in the mobile device 12 is positioned in alignment with a corresponding inductive charging element in the charging station 10. As will be recognized by those having ordinary skill in the art, the electromagnetic interaction between the inductive charging elements transfers the electrical power from the charging station 10 to the battery charging circuitry in the mobile device 12 for delivery to an onboard battery. As shown in FIG. 1, the first embodiment 10a may include an indicator lamp 13 that can be activated in response to various conditions such as the initiation of charging, the completion of charging, connection to a power source, and so forth, with each such status being reported with a different color.

Various embodiments of the present disclosure contemplate connecting the modular device charging station 10 to an alternating current (AC) electrical power source such as a common household 120 volt, 60 Hz wall outlet via a power cable 14. However, other embodiments may accommodate power sources of different regions where 240 volts is used. The power cable 14 as illustrated includes a standard non-polarized dual prong plug 16 that can be inserted into such a wall outlet, though this may be substituted for alternative prong configurations that are adapted to the corresponding sockets that differ in configuration from region to region. Although not shown, the plug 16 may also be polarized, where one prong is slightly larger than the other for insertion into a socket that is correspondingly configured with a larger and a smaller contact slot. The plug may also incorporate a grounding prong. In short, the plug 16 may be of any variety, and the specifics examples illustrated herein are not intended to be limiting.

The other end of the power cable 14 may include a non-polarized C7-type connector plug 18 that conforms to the International Electrotechnical Commission (IEC) 60320 standard for Appliance couplers for household and similar general purposes. To the extent a polarized plug 16 is utilized in the power cable 14, the plug 18 may also be polarized, that is, one side of the connector may be square instead of rounded. Furthermore, if a ground terminal is included in the plug 16, the plug 18 may be substituted with a C5-type connector, or any other connector type that includes a third connection to Earth. A more detailed view of the socket within which the plug 18 is received is shown in FIG. 3B, though because such a socket and the plug 18 that is intended for insertion therein are standard configurations, no additional details thereof will be described.

The modular device charging station 10 has a generally flat rectangular configuration, with a cradle body 20 that defines a device receptacle 22 within which the mobile device 12 is received and retained. The cradle body 20 is further defined by a left or input side 24, as well as an opposed right out output side 26. As an independent modular device charging station 10 shown in FIG. 1, attached to the left side 24 of the cradle body 20 is an input endcap 28, and attached to the right side 26 of the cradle body 20 is a terminating endcap 30.

Various embodiments of the present disclosure contemplate a system for charging a plurality of electronic devices with a series of modular device charging stations 10 (also referred to more generally as "modules"). In an exemplary configuration, these modules are daisy-chained from left to right, with the rightmost module being closest to the connection to the power supply, that is, the power cable 14. This configuration is exemplary only, and there may be alternatives that connect the power cable 14 to the rightmost module instead, with each successive module being connected to the left instead of to the right. Accordingly, the association of the left side 24 and an input functionality, and the right side 26 with an output functionality, is likewise exemplary only.

Figure 2:
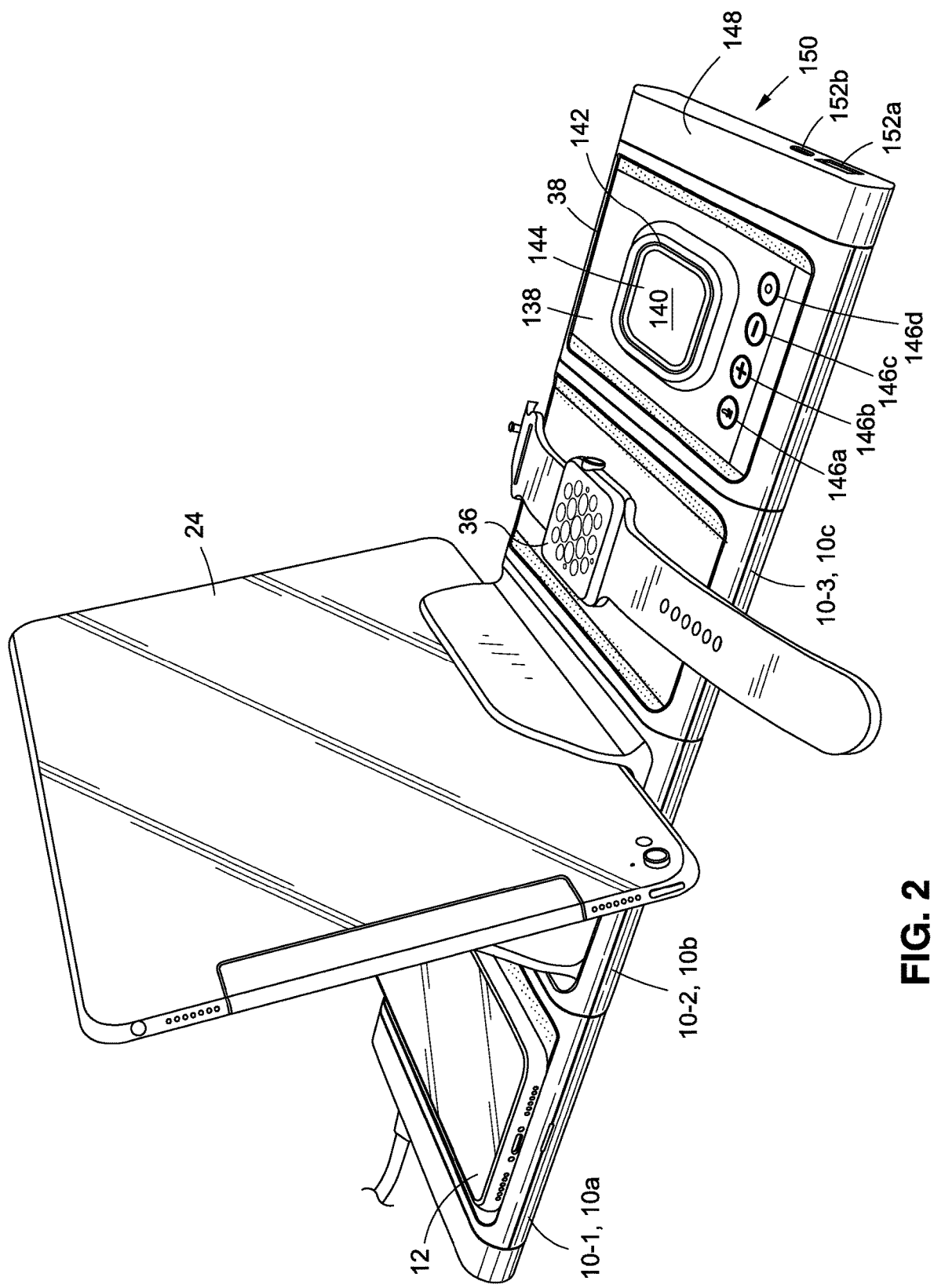
FIG. 2 is a perspective view of a system for charging a plurality of electronic devices including one station for inductively charging a smartphone device, one station for holding a tablet device, one station for charging a smart watch, and one station for a smart speaker.

With additional reference to FIG. 2, the modular device charging station 10 is understood to be a building block that forms one part of a system 32 for charging a plurality of electronic devices. In particular, there is a first modular device charging station 10-1 that is configured as the first embodiment 10a discussed above that inductively charges the mobile device 12. Additionally, there is a second modular device charging station 10-2 that is configured as a rack to hold one or more tablet devices 34. This variation will be referred to as a second embodiment 10b, the details of which will be further considered below. The system 32 further includes a third modular device charging station 10-3 that is configured as a third embodiment 10c as a charging cradle for a smart watch device 36. The details of the third embodiment 10c will be described more fully below. The system 32 may also incorporate other modular stations that, while lacking device charging functionality, may nevertheless include other valuable features that improve the user experience. One example is a smart speaker station 38, and the details thereof will also be discussed below.

Figure 3A:
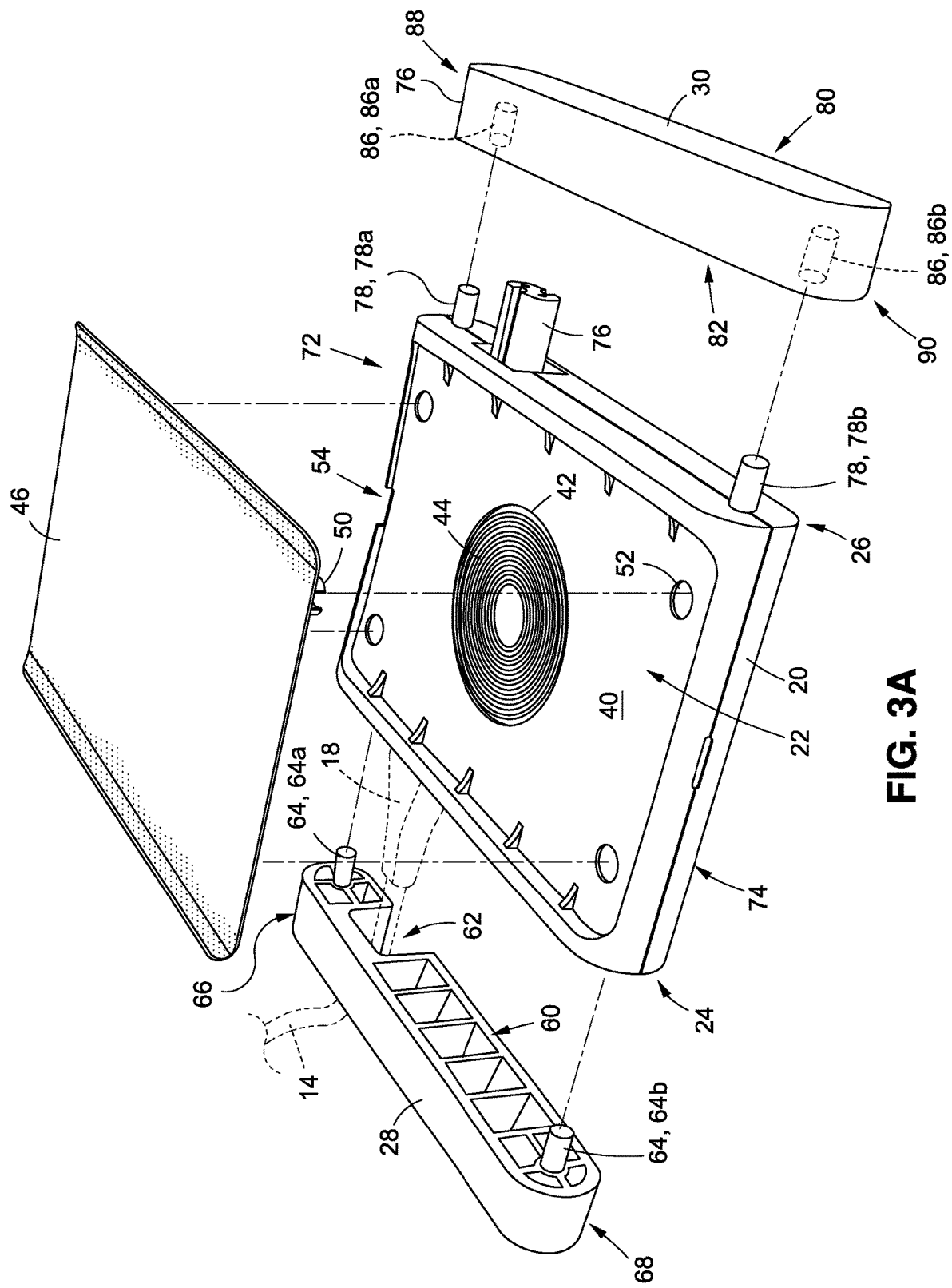
FIG. 3A is an exploded top perspective view of the module charging station shown in FIG. 1.
Figure 3B:
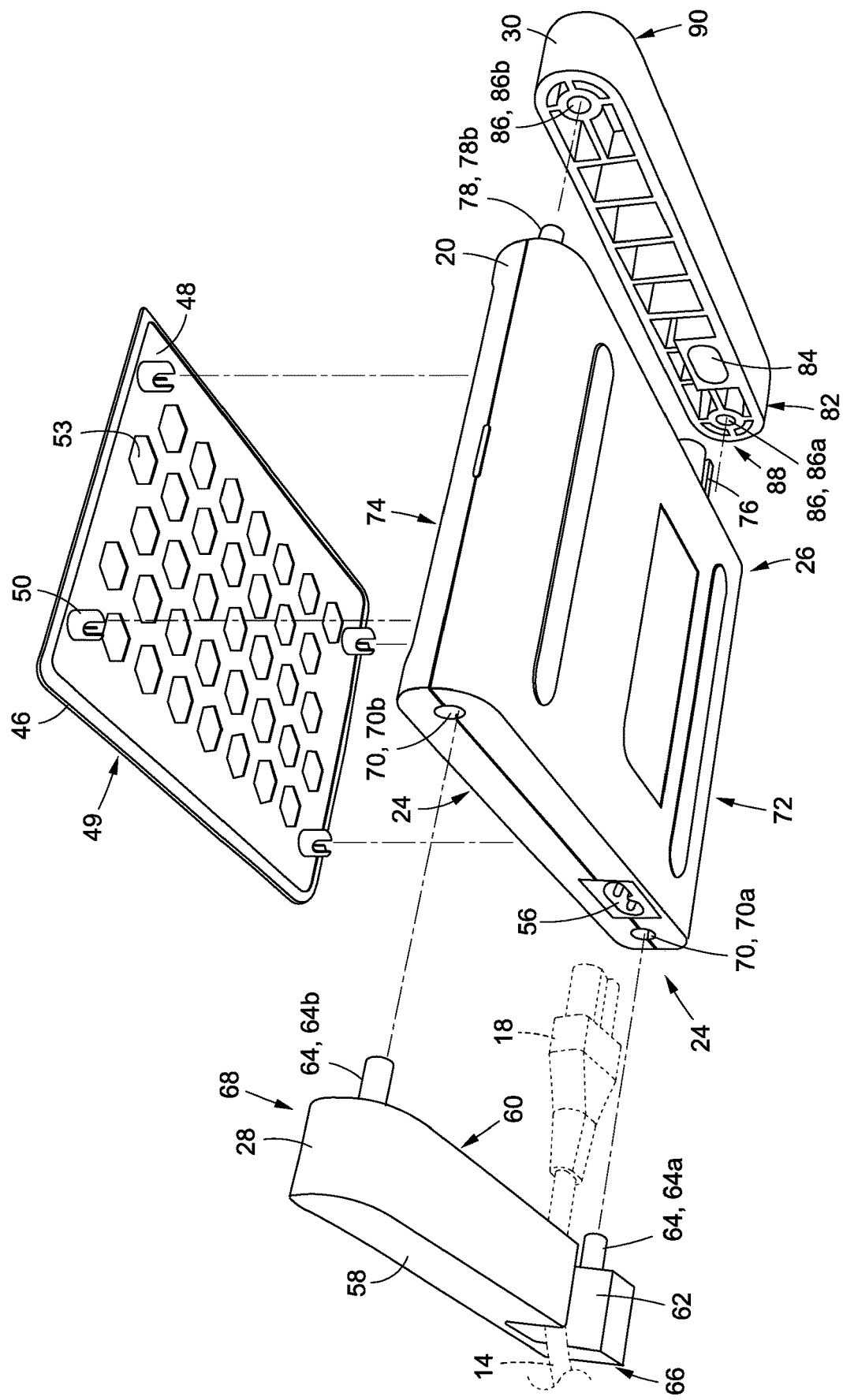
FIG. 3B is an exploded bottom perspective view of the embodiment of modular charging station shown in FIGS. 1 and 3A.

Referring now to FIGS. 3A and 3B, additional details of the modular device charging station 10 will be considered. As described above, the modular device charging station 10 is comprised of the cradle body 20, the input endcap 28, and the terminating endcap 30. The cradle body 20 defines the aforementioned device receptacle 22 that is sized and shaped to accept the mobile device 12. In further detail, the cradle body 20 defines a top face 40 including a circular opening 42 from which a planar, inductive charging coil 44 projects. In order to minimize power loss, the inductive charging coil 44 is raised from the top face 40 of the cradle body 20.

Also disposed on the top face 40, in other words, within the device receptacle 22, is textile panel 46 that is removable and frictionally engages the mobile device 12 to limit movement. Underneath the textile panel 46 is a subframe 48 that is substantially coextensive therewith, and includes a set of locators 50 that are configured to mate with a set of locator holes 52 on the top face of the cradle body 20 when in alignment with each other as shown in the fully assembled view of the modular device charging station 10. In the illustrated example, the locators 50 and the locator holes 52 are positioned on each of the four corners of the subframe 48 and the cradle body 20, respectively. The locator holes 52 are sized and shaped to match the cylindrical locators 50 for limited frictional engagement. Given the acrylonititrile butadiene styrene (ABS) plastic composition of the subframe 48 as well as the cradle body 20, those having ordinary skill in the art will recognize the needed dimensional differences between the locators 50 and the locator holes 52 to achieve a desirable level of retention of the subframe 48 to the cradle body 20 without being excessively loose or immovable.

The subframe 48 is understood to provide structural rigidity to the textile panel 46 and provide a rigid and even surface on which the mobile device 12 can rest. In this regard, the textile panel 46 may be glued, woven onto, or otherwise permanently affixed to the subframe 48. This assembly of the textile panel 46 and the subframe 48 may be referred to as a cradle panel 49. With the inductive charging coil 44 extending upwardly or raised relative to the top face 40 as described above, the subframe 48 is understood to avoid directing the entire weight of the mobile device 12 thereto. In order to minimize weight while maintaining a desirable strength/rigidity, there may be a series of hexagonal cutouts 53 that effectively define a honeycomb strut pattern. Aside from the slight device retention characteristics, the textile panel 46 thus largely fills a cosmetic role. Accordingly, the textile panel 46 may be provided in different fabric types and colors, and incorporate various graphic elements such as logos and the like. The entire assembly of the textile panel 46 and subframe 48 may be user-replaceable, so the cradle body 20 further defines a central access slot 54. A user's fingernails or a tool may be inserted within the central access slot 54 to pry out the assembly.

Figure 4:
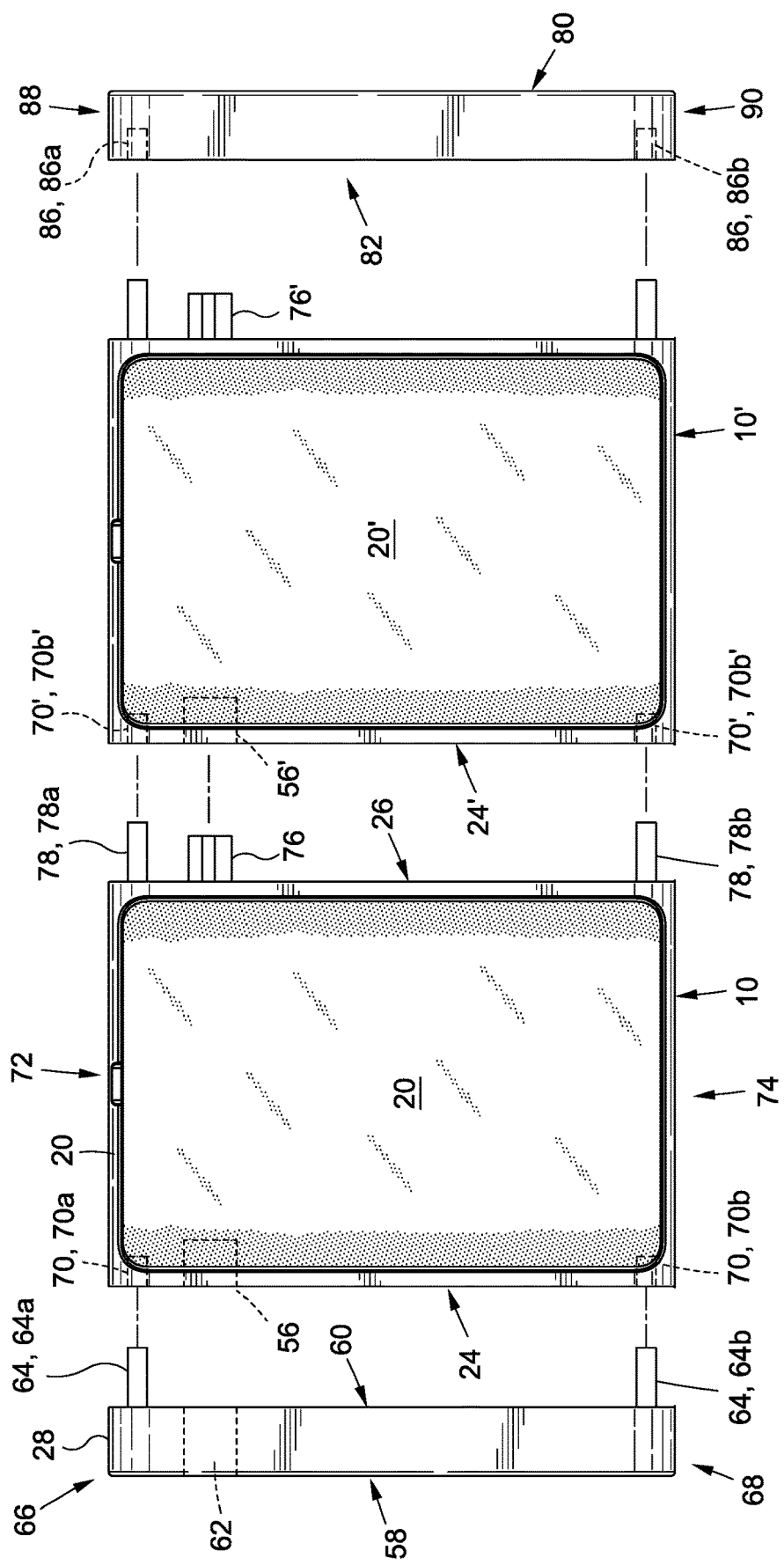
FIG. 4 is a top plan view of a system for charging a plurality of electronic devices with an input endcap, a first device charging station, a second charging station, and a terminating endcap separated from each other to illustrate its interconnectivity.

With additional reference to the top plan view of FIG. 4, the left side 24 of the cradle body 20, also referred to as the input side, includes a power connector socket 56 that receptively engages the plug 18 of the power cable 14. In the various disclosed embodiments, the plug 18 is a C7-type connector plug. To so receptively engage with the plug 18 thus configured, the power connector socket 56 is understood to be a C8-type connector socket. Alternatives utilizing different types of connector plugs are understood to consequently utilize corresponding connector sockets.

Attached to the left side 24 of the cradle body 20 is the input endcap 28. In further detail, the input endcap 28 has an elongate configuration with the same cross-sectional profile as that of the cradle body 20, as the two parts are intended to be mated together and have a cohesive or connected appearance. The input endcap 28 is defined by an external side portion 58, and an opposed interior side portion 60 that faces the left side 24 of the cradle body 20. The input endcap 28 defines a power connector slot 62 through which the power cable 14 is routed. The power connector slot 62 is thus in alignment with the power connector socket 56 In order for the power cable 14 to be detachable from the power connector socket 56 even with the input endcap 28 being attached to the cradle body 20, it is envisioned that the power connector slot 62 is sized to accommodate the wider plug 18 rather than just the narrower cable portion.

In order to securely fix the input endcap 28 to the cradle body 20, a similar modality utilized to securely fix the textile panel 46 and the subframe 48 to the cradle body 20 is contemplated. Specifically, the input endcap 28 includes a plurality of input locator pins 64 that are arranged in a predefined layout. There is a first input locator pin 64a positioned at a distal end 66 of the input endcap 28, and a second input locator pin 64b positioned at a proximal end 68 of the input endcap 28. In the embodiment as shown, the distal end 66 and the proximal end 68 are both characterized by a semi-circular shape, with an elongate middle section extending therebetween. As best illustrated in FIG. 3A, the positions of the input locator pins 64 are understood to be the radial centers of the semi-circular distal and proximal ends 66, 68.

The left side 24 of the cradle body 20 is understood to define one or more input-side locator holes 70, with a distal end 72 of the cradle body 20 defining a first input-side locator hole 70a, and an opposed proximal end 74 of the cradle body 20 defining a second input-side locator hole 70b. The input-side locator holes 70 are understood to receptively engage the correspondingly positioned or laid out input locator pins 64 on the input endcap 28 Like the input endcap 28, the distal end 72 and the proximal end 74 of the cradle body are both characterized by a semi-circular shape, with an elongate middle section extending therebetween. Similarly, the positions of the input-side locator holes 70 are understood to be radial centers of the semi-circular distal and proximal ends 72, 74.

The right side 26 of the cradle body 20, also referred to as the output side, includes a pass-through power connector plug 76. As will be described in further detail below, the pass-through power connector plug 76 is contemplated as being connectible to a power connector socket 56 of another one of the modules. In this regard, in order to ensure interchangeability and the modularity of the different modules, the power connector socket 56 may be a C7-type plug that is the same as the plug 16 of the power cable 14.

Also extending from the right side 26 of the cradle body 20 are a plurality of output locator pins 78 that are arranged in the predefined layout. A first output locator pin 78a is positioned at the distal end 72 of the cradle body 20, and a second output locator pin 78b is positioned at the proximal end 74 of the cradle body 20. Again, with the distal end 72 and the proximal end 74 of the cradle body 20 having a semi-circular shape with an elongate middle section extending therebetween, the positions of the output locator pins 78 are understood to be the radial centers of such semi-circular distal and proximal ends 72, 74.

Attachable to the right side 26 of the cradle body 20 may be either another charging station 10 or the terminating endcap 30, which will be considered first. As best shown in FIG. 3A and 3B, the terminating endcap 30 has a similar configuration to that of the input endcap 28, that is, it has an elongate configuration with the same cross-sectional profile as that of the cradle body 20. Like the input endcap 28, the terminating endcap 30 is intended to be mated together with the cradle body 20 and have a cohesive or connected appearance. The terminating endcap 30 is defined by an external side portion 80, and an opposed interior side portion 82 that faces the right side 26 of the cradle body 20.

The terminating endcap 30 further defines a plug pocket 84 that receptively engages the pass-through power connector plug 76 and is thus in alignment therewith. The plug pocket 84 accordingly has an opening on the interior side portion 82. Because other components, namely, the output locator pins 78, are intended to be used to attach the terminating endcap 30 to the cradle body 20, the plug pocket 84 need not be contoured to grip the pass-through power connector plug 76. Minimal, if any, mechanical engagement of the plug pocket 84 and the pass-through power connector plug 76 is envisioned to be necessary.

In further detail, the terminating endcap 30 also defines one or more terminating side locator holes 86 in the same predetermined layout as the other locator holes and locator pins relating to the cradle body 20 and the input endcap 28. A distal end 88 of the terminating endcap 30 defines a first terminating side locator hole 86a having an opening on the interior side portion 82, and a proximal end 90 of the terminating endcap 30 defines a second terminating-side locator hole 86b likewise having an opening on the interior side portion 82 Similar to the input endcap 28 and the cradle body 20 to which it is attached, the distal end 88 and the proximal end 90 of the terminating endcap 30 are both characterized by a semi-circular shape, with an elongate middle section extending therebetween. Thus, the positions of the terminating side locator holes 86 are understood to be radial centers of the semi-circular distal and proximal ends 88, 90. The terminating side locator holes 86 are understood to receptively engage the respective one of the output locator pins 78 of the cradle body 20. Like the other locator pins and locator holes discussed in the context of other components of the system 32, the terminating side locator holes 86 are understood to be sized and configured to frictionally retain the output locator pins 78.

In addition to attaching the terminating endcap 30, as was briefly mentioned above, the right side 26 of the cradle body 20 may be attached to another module. This feature is best illustrated in FIG. 4 that shows a first modular device charging station 10, and a second linked modular device charging station 10'. As discussed earlier, the first modular device charging station 10 includes the first cradle body 20, a first power connector socket 56 that is receptive to the plug 18 of the power cable 14, and the first pass-through power connector plug 76. Because one module is intended to be chained to one another, the first power connector socket 56 is contemplated to be axially aligned, with the first pass-through power connector plug 76. This alignment is continued to the second linked modular device charging station 10' that has a corresponding second linked cradle body 20', a second linked power connector socket 56', and a second linked pass-through power connector plug 76'. The first pass-through power connector plug 76 is receptively engaged within the second linked power connector socket 56'. Along these lines, the first output locator pins 78 on the right side 26 of the first cradle body 20 is receptively engaged within the second linked input-side locator holes 70'.

When utilized as a standalone charging station, the input endcap 28 and the terminating endcap 30 thus fill largely cosmetic roles of concealing the input-side locator holes 70 and the output locator pins 78, as well as the unused pass-through power connector plug 76 and the power connector socket 56 to a certain extent. When connecting a given charging station to an upstream one, the input endcap 28 can be removed as shown per the second linked modular device charging station 10'. When connecting the charging to station to a downstream one, the terminating endcap 30 can be removed, as shown per the first modular device charging station 10. Furthermore, although the present disclosure variously refers to the engagement of pins and corresponding holes, those having ordinary skill in the art will appreciate that a given element or structure may incorporate the other one of such interface elements rather than the one set forth. For example, rather than being a pin, the input endcap 28 may include input locator holes and the body 20 may include input locator pins. Additionally, the embodiments of the present disclosure need not be limited to pins and holes, and other modalities for temporarily attaching one structure to another such as threaded fasteners, hook-and-loop strips, and so on may be substituted.

Figure 5:
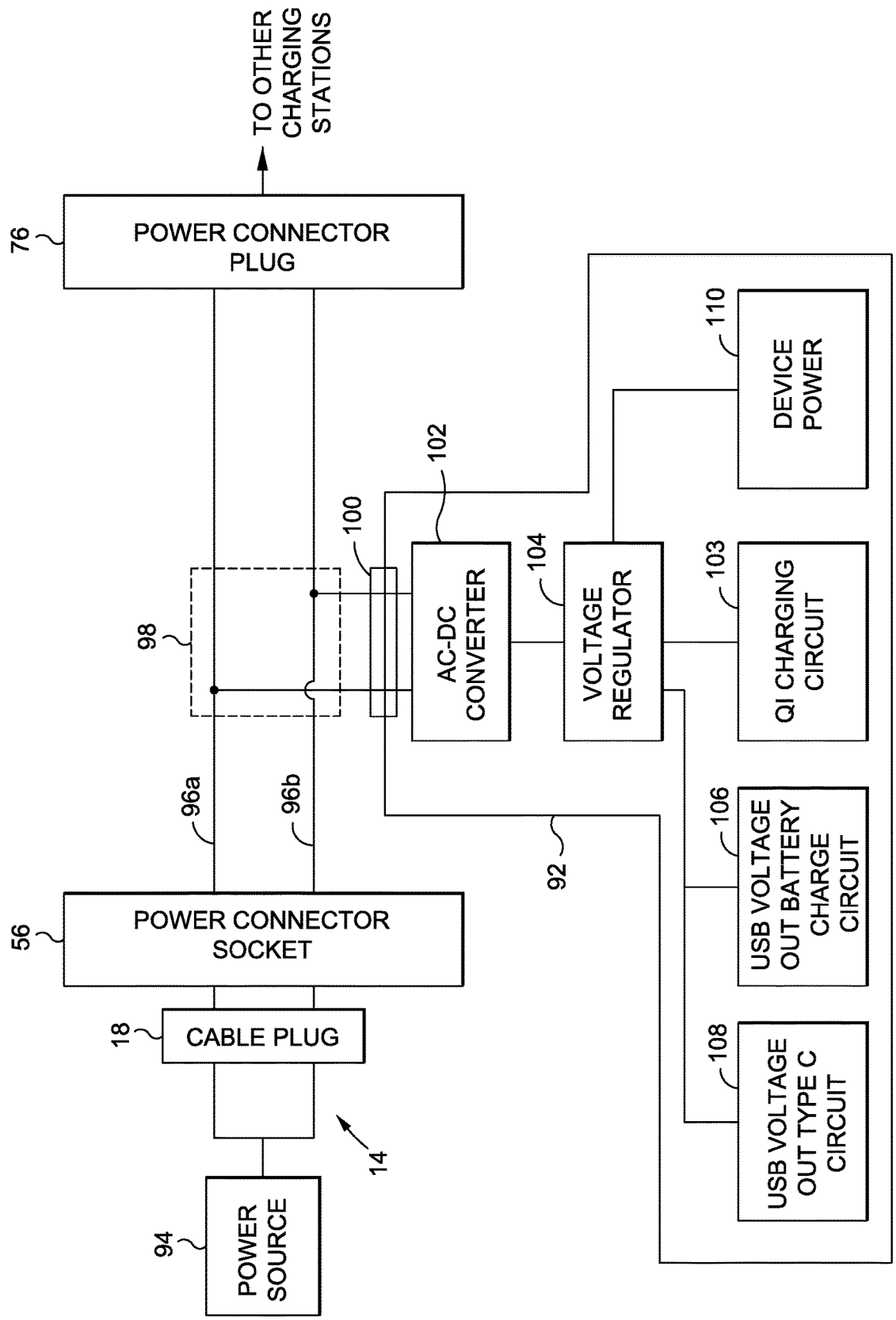
FIG. 5 is a block diagram of an electrical circuit utilized in one embodiment of the modular device charging station.

Various embodiments of the present disclosure contemplate delivering AC power to each individual charging station 10 or module, with the signal conditioning circuitry of each module converting the AC power to the needed DC voltage levels for charging the batteries of the specific devices for which it is configured. Referring to the block diagram of FIG. 5, the embodiments of the charging station 10 further envision a charging circuit 92, which is understood to refer generally to all electrical circuit components that serve the aforementioned function of converting line AC power to DC voltages for charging the device(s) connected to the charging station 10.

As considered above, an electrical power source 94 supplies alternating current (AC) voltage over the power cable 14, with the plug 18 thereof being connected to the power connector socket 56. A pass-through interconnect 96, which is comprised of a line interconnect 96a and a neutral interconnect 96b, define a direct or pass-through connection from the power connector socket 56 to the pass-through power connector plug 76. In one embodiment, the pass-through interconnect is an 18 AWG wire. A tap 98 is made in the pass-through interconnect 96, which relays the AC voltage to the charging circuit 92. In this regard, the charging circuit 92 includes a power signal input 100 that is ultimately connected to the power connector socket 56 to receive power therefrom.

The AC power may then be rectified to a DC signal with an AC-DC converter circuit 102. In order to better condition the DC signal output by the AC-DC converter circuit 102, a voltage regulator circuit 104 may be utilized. The regulated DC output voltage from the voltage regulator circuit 104 may then be provided to the various charging circuits. This configuration of the AC-DC converter circuit 102 and the voltage regulator circuit 104 may be more generally referred to as a power supply, though the specific components are presented by way of example only. Other configurations of power supplies known in the art may be substituted without departing from the scope of the present disclosure, as such variations in circuitry are within the purview of those having skill in the art.

One embodiment of the charging station 10, for example, the one discussed above in connection with FIGS. 1, 3A, and 3B, is understood to be a wireless mobile device charger that is implemented in accordance with the Qi specification. As such, the charging circuit 92 may incorporate a Qi charging circuit 103 configured as a base station with a system unit that controls a power conversion unit and a communications and control unit that regulates the output electrical signal to the inductive charging coil 44 based upon requests from the receiving device. Up to ten (10) watts of power may be delivered to the receiving device. Because a Qi charger implementation is well known in the art, additional details thereof will be omitted.

Other embodiments of the charging station 10 also contemplate outputting DC voltage levels in compliance with the USB standard, so that conventional USB cables and connectors can be utilized. Multiple current/power level outputs are possible—one output standard for battery charging defines an output current of 1.5 Amperes at 5 Volts, for a power output of 7.5 Watts. Thus, there may be a USB battery charging circuit 106. Alternatively, there may be a Type-C output standard that defines an output current of 3 Amperes at 5 Volts, for a power output of up to 15 Watts. This output may be provided by a USB voltage output Type-C circuit 108. These current or levels are exemplary only, and fewer or additional modules may be incorporated to accommodate different power needs. For a given power level output, there may be a separate charging circuit, or at least a different connection port that is specifically designated for the designated power level output level, so that when charging a device with greater power delivery needs, the charging cable need only be connected to the desirable port.

In addition to the foregoing charging circuits, the power supply in the modular device charging station 10 may provide a power signal for, for example, the smart speaker, and so there may be a device power supply circuit 110. Such power supply circuits are understood to be configured specifically for the power needs of the device, and need not follow set standards as is the case for the other circuits.

Figure 6:
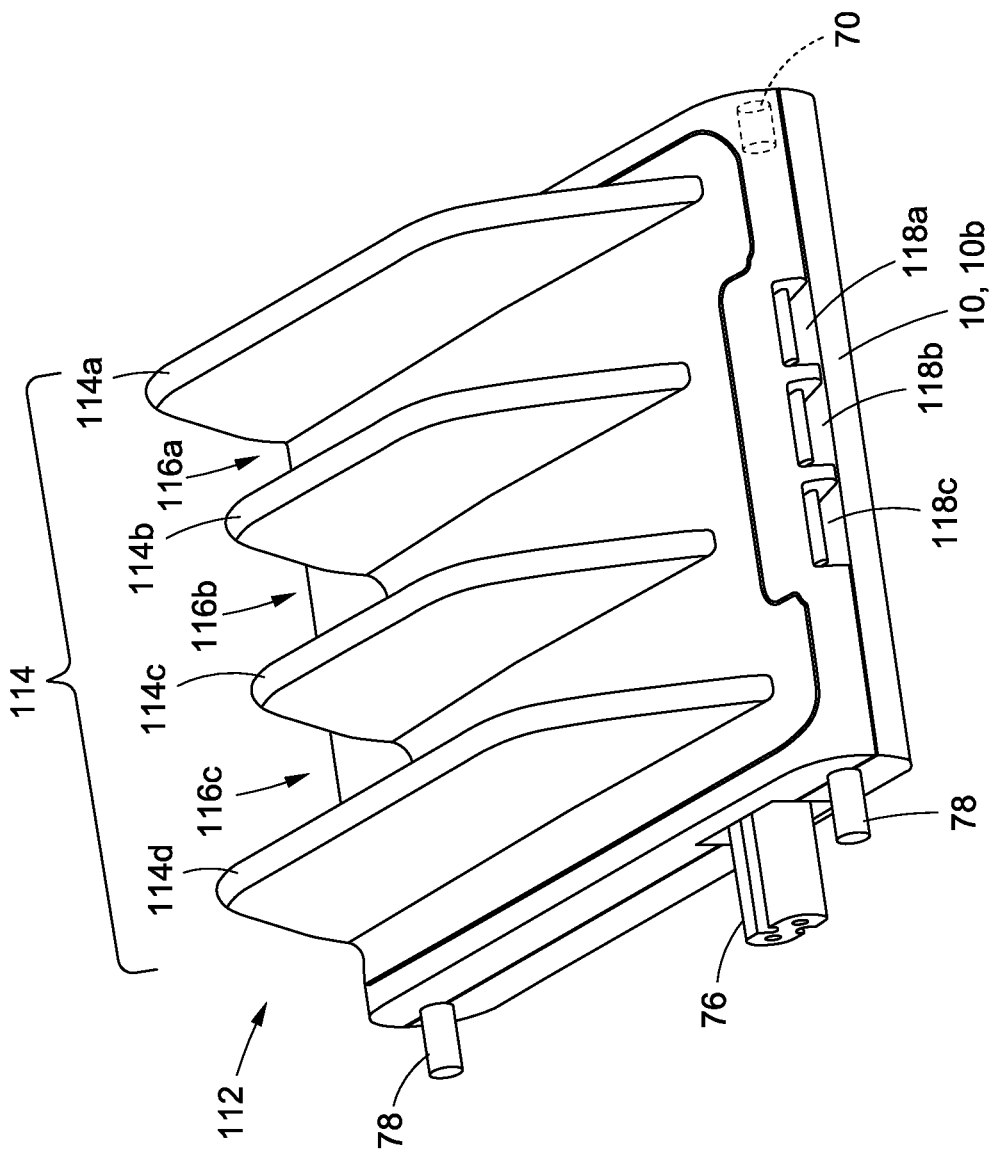
FIG. 6 is a rear perspective view of another embodiment of the modular device charging station configured for holding tablet devices.
Figure 7:
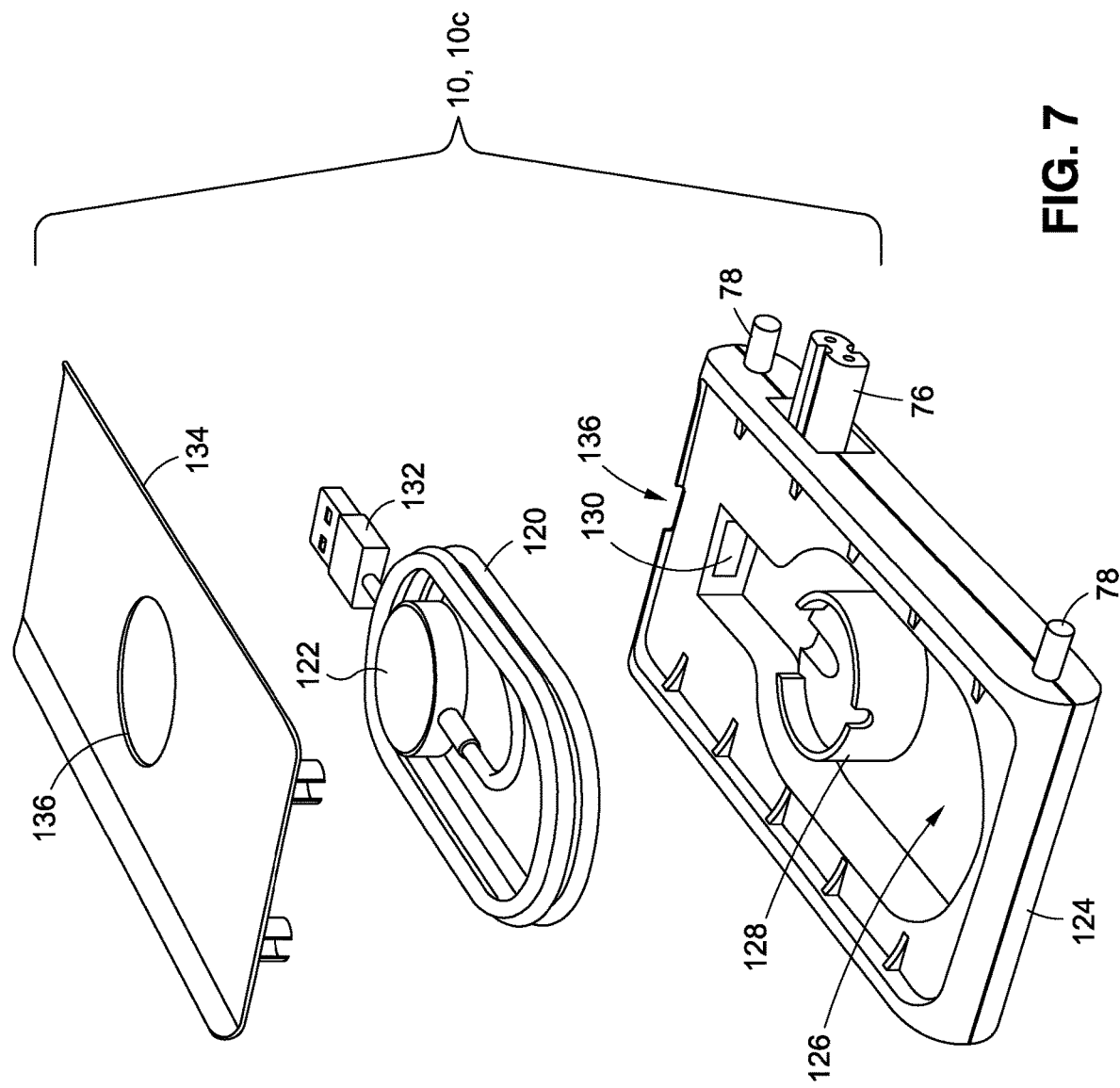
FIG. 7 is an exploded perspective view of still another embodiment of the modular device charging station configured for holding and charging a smart watch.

Referring back to FIG. 2, now having described the first modular device charging station 10-1 configured as the first embodiment 10a, additional details of the second modular device charging station 10-2 will be considered. The second embodiment 10b is configured as a rack 112 for vertically retaining the tablet devices 34. As best shown in FIG. 6, the rack 112 is defined by a series of slats 114, including a first slat 114a, a second slat 114b, a third slat 114c, and a fourth slat 114d. The first slat 114a and the second slat 114b define a first slot 116a, the second slat 114b and the third slat 114c define a second slot 116b, and the third slat 114c and the fourth slat 114d define a third slot 116c. Each of the slots 116 are understood to receive one tablet device 34 and maintain the same at a slight angle offset from vertical. The inner slats, that is, the second slat 114b and the third slat 114c, are shorter both lengthwise and vertically in comparison to the two outer slats, that is, the first slat 114a and the fourth slat 114d. Furthermore, the distal and proximal ends of each of the slats 114 are slightly angled. Both of these features are envisioned to reduce areas that may impact the tablet device 34 as it is being positioned within the respective slots 116.

The rack 112 is configured to hold up to three separate tablet devices 34. Although tablets with wireless inductive charging receivers may exist, due to the larger footprint of such devices, a single wireless charging module along the lines of the first embodiment 10a may not be the most space-efficient. Therefore, stacking the tablet devices 34 along horizontally is envisioned, with each slot 116 or tablet corresponding to one charging port. According to the illustrated embodiment, there is a first USB port 118a, a second USB port 118b, and a third USB port 118c, each of which may be connected to a charging circuit along the lines of the USB battery charging circuit 106 and the USB voltage output Type-C circuit 108. In a preferred, though optional embodiment, the charging circuit to which these USB ports 118 are connected is capable of outputting 12 Watts to each. As shown, the USB ports 118 are type A ports receptive to type A male connectors. The opposite end of the cables connecting the USB ports 118 to the tablet devices 34 may vary according to the specific configuration thereof, and may be Lighting, USB-C, USB-Mini, and so on.

The second embodiment 10b of the station otherwise incorporates the same modular connectivity components as the first embodiment 10a of the station, including the pass-through power connector plug 76, the power connector socket 56, the input-side locator holes 70, and the output locator pins 78. Thus, it may be connected to upstream and downstream modules in the manner described above. AC power may be received by way of the power connector socket (not shown) and the upstream source connected thereto. The received AC signal may then be passed to the next module by way of the pass-through power connector plug 76.

With reference again to FIG. 2, further details of the third modular device charging station 10-3 will be described. The third embodiment 10c of the station is configured as a charger for the smart watch device 36, which has a charging modality different from the Qi charger of the first modular device charging station 10-1, that is, the first embodiment 10a of the station. Instead of an integral inductive charging coil, an inductive charging cable 120 with a charger head 122 may be installed within a body 124. An interior region 126 includes a riser platform 128 that accepts and retains the charger head 122. Additionally, the interior region 126 may include a USB port 130, with access thereto being limited to the interior region 126. In other words, once fully assembled, the USB port 130 may be inaccessible from outside the body 124. The USB port 130 may be a type-A port, and so the inductive charging cable 120 includes a standard type-A connector 132. The interior region 126 may be contoured for routing the excess length of the inductive charging cable 120 therein. With the charger head 122 secured to the riser platform, a textile panel 134 defining an opening 135 may be attached on to the top of the body 124.

It is expressly contemplated that the inductive charging cable 120 is user-provided and user-installed. The inductive charging cable 120 is typically sold with the smart watch device 36 and is proprietary thereto. Thus, the interior region 126 is accessible by removing the textile panel 134. To this end, the body 124 defines an access slot 136, in which a tool or a user's fingernail may be inserted to pry away the textile panel 134.

The third embodiment 10c of the station otherwise incorporates the same modular connectivity components as the first and second embodiment 10a, 10b of the station, including the pass-through power connector plug 76, the power connector socket 56, the input-side locator holes 70, and the output locator pins 78. Thus, it may also be interchangeably connected to upstream and downstream modules in the manner described above. AC power may be received by way of the power connector socket (not shown) and the upstream source connected thereto. The received AC signal may then be passed to the next module by way of the pass-through power connector plug 76.

As shown in FIG. 2 and briefly mentioned above, the system 32 may also include other modular stations such as the smart speaker station 38. In further detail, the smart speaker station 38 has a body 138 with a raised mound portion 140 with one or more loudspeakers and one or more microphones, along with a multi-color illuminated bezel 142. The actual loudspeakers and microphones are understood to be concealed by the grille 144 and are not referenced in FIG. 2. In one implementation, there microphone may be an array comprised of four discrete microphones.

Along these lines, there may be multiple speakers covering different frequency ranges. That is, there may be a full range speaker with a dimension of 25 mm radiator diameter, combined with a bass speaker with a 40 mm radiator diameter. Additionally, a passive radiator may be utilized.

The smart speaker station 38 incorporates a virtual assistant that responds to voice prompts and performs various tasks such as playing music, finding an answer to a question, and controlling lights in a room. For those inputs that cannot be provided by voice command, the smart speaker station 38 further includes buttons 146*a-d*. A first button 146*a* is understood to be a microphone mute button, a second button 146*b* may be a volume increase button, a third button 146*c* may be a volume decrease button, and a fourth button 146*d* may be an action button. By pressing the action button for varying durations, or after different prompts from the virtual assistant, different sub-functions or configuration options may be set. Visual interactivity in indicating the status of the virtual assistant is provided by the multi-color illuminated bezel 142.

By way of example and not of limitation, the virtual assistant utilized in the smart speaker station 38 may be the Alexa virtual assistant from Amazon.com, Inc. However, any other virtual assistant may be substituted, such as the Google Virtual Assistant, Ski from Apple, Inc., and so forth. The aforementioned buttons 146 are understood to be specific to the Alexa virtual assistant, so any change in the virtual assistant is understood to involve changes to the hardware interface elements.

The smart speaker station 38 also incorporates the same modular connectivity components as the first, second and third embodiments 10*a*, 10*b*, and 10*c* of the station as described above. Although FIG. 2 does not show these components, the smart speaker station is also understood to include the pass-through power connector plug 76, the power connector socket 56, the input-side locator holes 70, and the output locator pins 78. It may also be interchangeably connected to upstream and downstream modules, with AC power being received through the power connector socket and the upstream source connected thereto. The received AC signal can be passed to the next module by way of the pass-through power connector plug 76.

Instead of attaching the terminating endcap 30 to the last module in the chain, an active power delivery station 148 may be substituted. FIG. 2 best illustrates the active power delivery station 148. The upstream pass-through power connector plug 76 is connected to another power connector socket 56 that is integrated into active power delivery station 148. The same charging circuit 92, or one similar thereto that is capable of converting the AC signal to a USB-compliant DC voltage is incorporated. On an external side portion 152 is a first USB port 152*a* that is provided as a type-A connector, along with a second USB port 152*b* that is provided as a USB-C connector. The first USB port 152*a* is understood to be connected to a charging circuit that is capable of outputting 12 Watts of power, while the second USB port 152*b* is connected to a charging circuit that is capable of outputting 17 Watts of power.

The active power delivery station is attached to the last module using the same modalities discussed earlier, including the output locator pins 78 that are engageable with correspondingly positioned terminating side locator holes 86. In addition to the electrical connection established between the pass-through power connector plug 76 of the upstream station and the power connector socket 56, there is a mechanical link established between such components. This supports and improves the retention of the active power delivery station 148 to the upstream station, which in the illustrated embodiment, is the smart speaker station 38.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A modular device charging station connectible to a power source through a cable, comprising;
    an input endcap defining a power connector slot, the input endcap including a plurality of input locator pins in a predefined layout extending from an interior side face with a predefined profile;
    a cradle body defined by a device receptacle, an input side with an input side external face with the predefined profile, and an opposed output side with an output side external face with the predefined profile, the input side of the cradle body including a power connector socket connectible to the cable and in alignment with the power connector slot of the input endcap, and one or more input side locator holes receptively engageable with the input locator pins of the input endcap arranged in the predefined layout, the output side of the cradle body including a pass-through power connector plug and a plurality of output locator pins in the predefined layout extending from the output side external face, the cradle body being engageable to the input endcap in an abutting relationship to the interior side face thereof with both maintaining a contiguous profile with each other;
    a terminating endcap defining a plug pocket in alignment with the pass-through power connector plug and a plurality of terminating-side locator holes in the predefined layout extending from an interior side face with the predefined profile, the terminating endcap being engageable to the cradle body in an abutting relationship to the output side external face thereof with both maintaining a contiguous profile with each other, the terminating-side locator holes being receptively engageable with the output locator pins of the cradle body; and
    a charging circuit with a power signal input connected to the power connector socket, the pass-through power connector plug being electrically connected to the power connector socket.

2. The modular device charging station of claim 1, further comprising a charging signal output interface connected to the charging circuit and a device charging interface.

3. The modular device charging station of claim 2, wherein the charging signal output interface is an inductive charging coil circuit.

4. The modular device charging station of claim 2, wherein the charging signal output interface is a device interconnect socket.

5. The modular device charging station of claim 4, wherein the device interconnect socket is a Universal Serial Bus (USB) port.

6. The modular device charging station of claim 2, further comprising a cradle panel disposed on the device receptacle of the cradle body, the device charging interface being positioned on the cradle body to face the cradle panel.

7. The modular device charging station of claim 1, wherein the cable includes an input plug connectible to the power source and an output plug receptively engageable in the power connector socket.

8. The modular device charging station of claim 7, wherein the output plug of the cable and the pass-through power connector plug are both C7 type connectors.

9. The modular device charging station of claim 8, wherein the power connector socket is a C8 type connector receivably engageable to the C7 type connector of the output plug of the cable.

10. The modular device charging station of claim 1, wherein the charging circuit includes a power supply receiving an alternating current power signal from the power source for conversion to a direct current charging signal.

\* \* \* \* \*